(No Model.)

N. S. KEITH.
DYNAMO ELECTRIC MACHINE.

No. 353,310. Patented Nov. 30, 1886.

WITNESSES:

INVENTOR:
N. S. Keith.

UNITED STATES PATENT OFFICE.

NATHANIEL SHEPARD KEITH, OF SAN FRANCISCO, CALIFORNIA.

DYNAMO-ELECTRIC MACHINE.

SPECIFICATION forming part of Letters Patent No. 353,310, dated November 30, 1886.

Application filed January 7, 1886. Serial No. 187,860. (No model.)

*To all whom it may concern:*

Be it known that I, NATHANIEL SHEPARD KEITH, a citizen of the United States, and a resident of San Francisco, in the county of San Francisco and State of California, have invented certain new and useful Improvements in Dynamo-Electric Machines, of which the following is a specification.

The objects of my improvements are, first, lessening the cost of manufacture; second, securing a better method of fastening together and to the spider or carrier the parts of the cores of the armatures; third, the prevention of sparks at the commutator and brushes, and of overheating of the armatures; and, fourth, gaining higher efficiency of dynamo-electric machines.

My invention consists in, first, constructing the body or core of a ring-armature so as to place in it as much iron as possible in a cheap and effective manner, but so divided as to avoid Foucault currents in the core; and, second, in surrounding this core with coils or bobbins of wire after a system of winding, hereinafter described.

Figure 2:
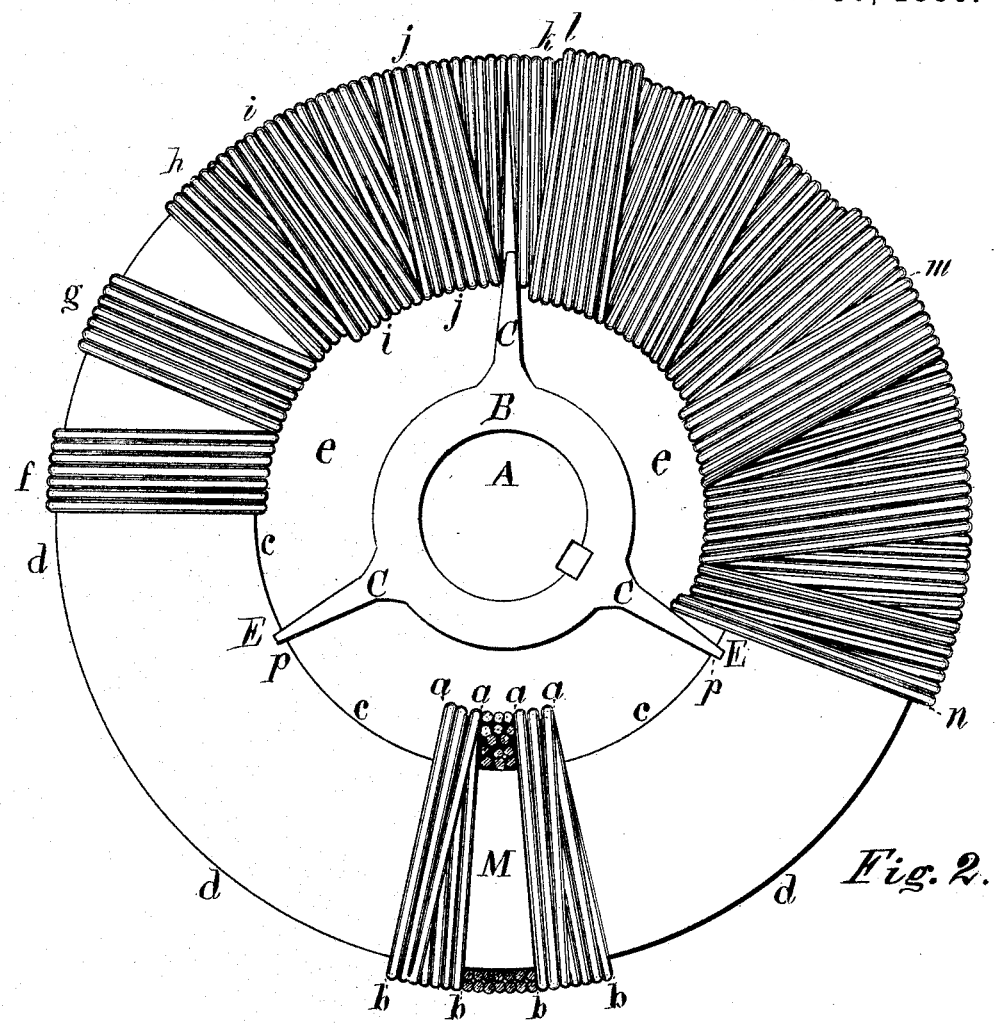
Figure 1:
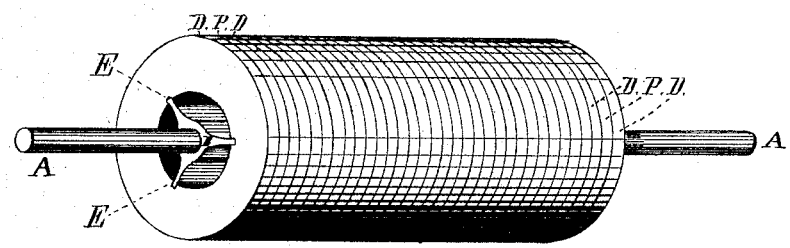

Figure 1 of the accompanying drawings represents my armature-core, and Fig. 2 represents my system of winding compared with that usually practiced by others.

In practicing my invention, I mount upon a suitable shaft, A, Figs. 1 and 2, a spider or carrier, B, of brass, bronze, or other suitable non-magnetic metal. This spider is preferably made of one piece of metal and with three arms, C, as shown, though, of course, two or more than three arms may be used. I then place alternately disks or flat rings of iron D, and of paper P, or like insulating material on the spider until it is about completely filled with these disks. The notches $p$ in the disks serve to keep the disks in place circumferentially, while to keep them from separating and from moving from the spider in directions parallel with the shaft, I rivet over or upset the sides of the arms of the spider against the outermost disks, as at E, where the notches $p$ of the disks engage with the arms of the spider.

The alternations of the thin iron and paper disks so far insulate the iron disks from one another as to reduce to the minimum the so-called "Foucault currents," which circulate in massive cores of armatures during the performance of their functions.

I do not claim alternation of disks of iron and insulating material in armatures to be original with me; but I believe that this manner of mounting the disks upon the spider is original with me, and I know it to be a superior mechanical contrivance to other practiced methods, as well as being more secure electrically, because the disks are more conveniently and securely fastened and retained in place than by the usual method of passing insulated and other bolts or rods through holes or passages provided in the disks. In this described way I very much cheapen the cost of construction of armature bodies or cores and avoid the possibility of electrically connecting the iron disks together by failure in insulation of bolts used in other armatures. I then cover the ends and the external and internal peripheries of the ring-armature core so made with a suitable insulating layer of material—such as paper, cloth, or the like—and then proceed to wind upon the surfaces so prepared the coils, bobbins, or sections of insulated wire, needful to complete the armature.

It has heretofore been the practice in constructing ring-armatures—such as the Gramme and its modifications—to so wind the bobbins or sections that they each had in cross-section the form of a sector, as a whole, as well as in the internal and external parts of each bobbin, and also at the ends of the ring or armature the wires have been, as nearly as possible, laid on radial lines, so that in the aggregate they formed a sector representing the outline of the bobbin. This construction is shown at M, Fig. 2. It will be observed that the lines of separation, $a$ and $b$, of the bobbins are radii from the axis of the ring. This construction gives rise to sparks at the collector or commutator as its several sectors are passed under the brushes; because, in operation each bobbin is the seat of an electro-motive force, and as the two sectors of the collector connected to the two ends of the wire of a bobbin about to cross the line of commutation pass under the brush, the wire of that bobbin is short-circuited upon itself, so that a local current of great intensity (quantity) flows in it for the moment, serving only to heat the bobbin and armature without useful effects. The electro-motive force of the bobbin is not neutralized except at the instant after passing the line of commutation or of reversal—the magnetic neutral line—and then only by instantaneous reversal. When this local short circuit is broken by movement of the sectors from under the brush, the usual sparking occurs that is due to the breaking of a circuit in which a current exists. My method of winding obviates these bad conditions by so arranging the wires that at the moment of commutation the convolutions of wire in the bobbin whose commutator-sectors are passing the line of commutation are divided on the two sides of the neutral line, so that there are then two counter electromotive forces therein, which neutralize each other.

Referring to Fig. 2, I prefer to make the inner periphery, $c$, approximately one-half that of the outer periphery, $d$, of the core, for the reason which will be apparent after this description.

Having covered the surfaces of the core with suitable insulating-covers, as of paper, I then divide, by lines parallel to the axis, the outer periphery into a number of equal circumferential divisions, which number is one-half of the number I desire of bobbins to the armature. I then wind insulated wire on one division, parallel with the division lines, threading it through the space $e$ until the division is filled with one layer of convolutions placed side by side, both internally and externally, as shown at $f$, Fig. 2. I next wind wire similarly in the second and fourth divisions from the first, as at $g$ and $h$, and so on until I have filled all the alternate divisions around the outside of the core. When this is done, the inner periphery is covered with wire, but the outer periphery is but one-half covered. I then begin to similarly fill the intermediate divisions of the outer periphery, laying the wires as before, except that on the inner periphery they cover the wires previously laid, as is shown by $i\ j\ k$, Fig. 2. These wires are laid so that those of each intermediate bobbin overlie approximately one-half of the wires of each of the two adjoining or alternate bobbins, lying on the inner periphery of the core. Upon the completion of this stage the core has upon it two layers of convolutions of insulated wire on the inner periphery, and one layer on the outer periphery. I then begin the next layer and series of bobbins at approximately one-half the distance between the ends of one of the first-wound bobbins, as at $k$ and $l$, Fig. 2, and lay the wires constituting the next several bobbins after the manner of the first series, until the whole is again covered with one more layer of convolutions on the outer periphery, and two more on the inner periphery, as at between $m$ and $n$. I then conjoin the beginning end of the wire of one of the inner layer of bobbins with the ending end of that of one of the outer layer of bobbins half overlying it, and the beginning end of this latter with the ending end of the next underlying inner bobbin, and so on until all the bobbins have been connected up into one endless circuit, as in the well-known Gramme or Pacinnoti winding.

If only one layer of convolutions of wire is desired on the outer periphery, then I divide the outer periphery into the full number of divisions that I desire of bobbins, and proceed to fill them with wire, as just described, but stopping when the one layer is completed. The ends are then joined to the collector or commutator, as in the Gramme armature.

If three layers of convolutions of wire are desired, I divide, as in the first case, for the first layer, but begin the second layer approximately one-third over the bobbin of the first layer, and begin the third layer two-thirds over the same bobbin, connecting or conjoining the ends after the same system.

It will be observed that by my winding the bobbins are not divided one from another by radial lines, as in previous windings, with all the consequent abrupt changes in the direction of the currents induced in such, but their wires are, as it were, interlaced and interspersed, so that even before one bobbin has completely passed the neutral line its succeeding bobbin on the plane of rotation has some of its convolutions already over the line. Under this condition the consequent counter electro-motive forces of these two bobbins neutralize each other, so that when the commutator-sectors of the former bobbin pass under and from under the brush, little or no sparking ensues, and while the brush is bearing on the two sectors of the commutator belonging to the receding and approaching two bobbins the counter electro-motive forces prevent the existence of a local current with its strongly-heating effects.

In this just-described way I secure the following among other advantages: first, compactness of construction, as the wires in the inner part of the ring-core occupy less space than the same number do by other systems of winding; second, avoidance of sparks at the brushes, and the deleterious effects of short-circuiting the bobbins as their collector-sectors pass under the brushes; and, third, the various consequences of such sparks and short-circuiting.

I am aware that ring-armatures have been made with but a single layer of conductors within and without the ring; but the conductors have been specially prepared by making the portions within the ring smaller or thinner in proportion to the less diameter. I do not claim such a winding to be my invention. My winding is of wires of the same size at all parts. This feature and the method of constructing the armature-core, and the combination of the several parts which constitute the armature-core, I reserve as the subject of another application for Letters Patent.

Having described my invention, I claim as new and original with me—

1. A ring-armature of a dynamo-electric machine, in which armature the convolutions of a fractional part—such as the one-half, one-third, &c.—of the total number of its bobbins overlie, both within and without the ring, the convolutions of the remainder of the bobbins.

2. The method of winding the circuit of a ring-armature of a dynamo-electric machine, which consists in winding the several bobbins in alternating order as follows: first, bobbins Nos. 1 3 5 7 9, *et seq.*, and then Nos. 2 4 6 8, *et seq.*

3. A ring-armature of a dynamo-electric machine, in which armature the convolutions of a fractional part—such as the one-half, one-third, &c.—of the total number of its bobbins (which part is divided and so interspersed at intervals among the remainder of its bobbins) overlie in the inner part of the ring the convolutions of the remainder of the bobbins.

4. A ring-armature of a dynamo-electric machine, in which armature the convolutions of a fractional part—such as the one-half, one-third, &c.—of the total number of its bobbins overlie on the outer part of the ring the convolutions of the remainder of the bobbins.

5. A ring-armature of a dynamo-electric machine, in which armature the convolutions of a fractional part—such as the one-half, one-third, &c.—of the total number of its bobbins overlie in the inner part of the ring the convolutions of the remainder of the bobbins.

6. A ring-armature of a dynamo-electric machine, in which armature the convolutions of each one of a fractional part, as one-half, one-third, &c., of the total number of bobbins overlie complementary parts, as one-half, one-third, and two-thirds, of their adjacent bobbins, substantially as described.

Signed at San Francisco, in the county of San Francisco and State of California, this 18th day of December, A. D. 1885.

NATHANIEL SHEPARD KEITH.

Witnesses:
G. W. OSBORN,
I. LAWTON.